(12) United States Patent
Ciebien et al.

(10) Patent No.: US 6,174,959 B1
(45) Date of Patent: *Jan. 16, 2001

(54) COMPATIBLE BLENDS OF THERMOPLASTIC POLYURETHANE WITH CERTAIN POLYOLEFINS

(75) Inventors: Jane F. Ciebien, Moon Township; Rick L. Archey, Pleasant Hills; H. Lee Noble, Upper St. Clair, all of PA (US)

(73) Assignee: Bayer Corporation, Pittsburgh, PA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/132,575

(22) Filed: Aug. 11, 1998

(51) Int. Cl.[7] .................................................. C08L 75/08
(52) U.S. Cl. ............................................. 525/131; 525/460
(58) Field of Search ............................................. 525/131

(56) References Cited

U.S. PATENT DOCUMENTS

| | | | |
|---|---|---|---|
| 3,272,890 | 9/1966 | O'Leary, Jr. .......................... | 260/859 |
| 3,929,928 | 12/1975 | Wolf, Jr. et al. .................. | 260/859 R |
| 4,238,574 | 12/1980 | Megna ................................. | 525/130 |
| 4,684,576 * | 8/1987 | Tabor ................................... | 428/441 |
| 4,975,207 | 12/1990 | Lee ....................................... | 524/494 |
| 4,990,557 | 2/1991 | Lee ....................................... | 524/494 |
| 5,109,050 * | 4/1992 | Takahashi ............................ | 524/425 |
| 5,623,019 | 4/1997 | Wiggins et al. ....................... | 525/92 |

FOREIGN PATENT DOCUMENTS

| | | |
|---|---|---|
| 3904802 | 8/1990 | (DE) . |
| 347794 | 12/1989 | (EP) . |
| 641828 | 3/1995 | (EP) . |
| 839867 | 5/1998 | (EP) . |

OTHER PUBLICATIONS

Organic Coatings Plastics Chemistry, vol. 40, p. 664 (month unavailable) 1979.
Walker's Handbook of Thermoplastic Elastomers, Sec. 5.4.17 (date unavailable).

* cited by examiner

Primary Examiner—Patricia A. Short
(74) Attorney, Agent, or Firm—Joseph C. Gil; Aron Preis

(57) ABSTRACT

A thermoplastic molding composition comprising a thermoplastic polyurethane and an olefinic copolymer is disclosed. The polyurethane component contains ether structural units and units derived from an aliphatic isocyanate. The molecular structure of the copolymer contains units derived from monomers containing olefinic unsaturation. The composition is characterized in the compatibility of its resinous components and in the improved mechanical properties.

7 Claims, No Drawings

COMPATIBLE BLENDS OF THERMOPLASTIC POLYURETHANE WITH CERTAIN POLYOLEFINS

The invention relates to thermoplastic molding compositions which contain thermoplastic polyurethane and a copolymer of at least one monomer containing olefinic unsaturation; more particularly, the thermoplastic polyurethane is characterized in that it is a reaction product of an aliphatic isocyanate.

BACKGROUND OF THE INVENTION

Thermoplastic polyurethane resins (TPU) are generally produced by reacting a polyol, a diisocyanate and a glycol chain extender. The properties of these resins depend to a large extent on the relative amounts of the reactants. These resins have been blended with other thermoplastic resins to produce compositions having a variety of properties making them suitable for a host of applications. Although non-polar polyethylene, or polypropylene, and polar TPU have been viewed as incompatible one with the other, such blends are desirable and some, containing small amounts of the olefins have been reported.

For instance, U.S. Pat. No. 3,929,928 indicates that mill blending of a thermoplastic polyurethane with polyethylene results in severe plate-out due to incompatibility of the two polymers. Researchers have reported in *Organic Coatings Plastics Chemistry*, Vol. 40, page 664 (1979) that it was impossible to prepare with a roll mill useful test specimens at any polyurethane/polyethylene blend ratios. Similarly, Walker's *Handbook of Thermoplastic Elastomers*, Section 5.4.17, reports that low density polyolefin modifications of polyurethane polymers must be maintained below 3 percent to avoid adverse effects due to incompatibility of the two polymers. Although U.S. Pat. No. 3,272,890 purports useful blends of polyolefin and soft polyurethane polymers, such blends are polyolefin based, containing less than 25 percent by weight polyurethane polymer where polyurethane polymer contents above 25 percent are incompatible and cannot be molded into useful plastic containers. Crystalline high density polyethylene or polypropylene polymeric blends are even more difficult to prepare due to incompatibility of the crystalline polyolefins with polyurethanes. Useful blends of thermoplastic polyurethane elastomers containing less than 15 percent by weight neutralized ethylene/carboxylic acid copolymers are disclosed in U.S. Pat. No. 4,238,574 to provide elastomeric blends useful in blow-molding operations.

U.S. Pat. No. 4,975,207 disclosed a blend of TPU and a carbonyl-modified polyolefin. U.S. Pat. No. 5,623,019 disclosed a compatibilized composition containing TPU and polyolefin. A particularly structured copolymer which contains blocks of monoalkylene arene and conjugated diene is said to compatibilize the components.

U.S. Pat. No. 4,990,557 disclosed the preparation of mechanically stabilized compatible blends of TPU and an at least mostly crystalline polyolefin by a high shear mixing of a melt of these polymers.

DETAILED DESCRIPTION OF THE INVENTION

The thermoplastic molding composition in accordance with the present invention comprise (i) 99 to 50, preferably 95 to 60 percent of a thermoplastic polyurethane, the molecular structural of which contains ether units and units derived from an aliphatic isocyanate, and (II) 1 to 50, preferably 5 to 40 percent of a copolymer, the molecular structure of which contains units derived from monomers containing olefinic unsaturation.

The thermoplastic polyurethanes suitable in the preparation of the inventive composition are known and are commercially available, for instance, under the Trademark Texin, from Bayer Corporation. Typically, the suitable TPU has a melt flow rate of about 4 to 100, more preferably 10 to 90 g/10 min., per ASTM D-1238.

These resins are prepared by reacting a suitable polyol, polyisocyanate and a chain extender by methods which have long been documented in the relevant literature.

The polyols suitable in the preparation of the TPU of the present invention are characterized in that they contain at least one ether structural unit. These, often referred to as polyether polyols, have a number average molecular weight of at least 400, preferably at least 1250 and most preferably at least 2,000 but less than 20,000, preferably less than 10,000, and more preferably less than 8,000. The functionality of the polyol, the number of isocyanate-reactive hydrogen atoms per molecule, is preferably not greater than 6 and more preferably the functionality is in the range of 2 to 4. The suitable polyether polyols include polyoxyethylene glycols, polyoxypropylene glycols, copolymers of ethylene oxide and propylene oxide, polytetramethylene glycols, copolymers of tetrahydrofuran and ethylene oxide and/or propylene oxide. The preferred polyether polyols are copolymers of ethylene and propylene oxide.

It is not unusual, and in some cases it might be advantageous, to employ more than one polyol. Exemplary of such additional polyols are polyester polyols, hydroxy terminated polycarbonates, hydroxy terminated polybutadienes, hydroxy terminated polybutadiene-acrylonitrile-copolymers and hydroxy terminated copolymers of dialkyl siloxane and mixtures in which any of the above polyols are employed as a minor component (less than 50% relative to the weight of the mixture with polyether polyols). The preferred embodiment entails polyether polyol alone.

Any of the organic, aliphatic polyisocyanates, preferably diisocyanates which are known in polyurethane chemistry, may be used in preparing the TPU of the present invention. Illustrative of such isocyanates are hexamethylene diisocyanate, isophorone diisocyanate, methylene bis (cyclohexyl isocyanate) as well as the 4,4'-isomer, 2,4'-isomer and mixtures thereof, cyclohexylene diisocyanate, as well as its 1,2-isomer, 1,3-isomer, and 1,4-isomer, 1-methyl-2,5-cyclohexylene diisocyanate, 1-methyl-2,4-cyclohexylene diisocyanate, 1-methyl-2,6-cyclohexylene diisocyanate and 4,4'-isopropylidene bis(cyclohexyl isocyanate).

Glycols suitable as chain extenders in the present context are also known. Typically, the extenders can be aliphatic straight and branched chain diols having from 2 to 10 carbon atoms, inclusive, in the chain. Illustrative of such diols are ethylene glycol, 1,3-propanediol, 1,4-butanediol, 1,5-pentanediol, 1,6-hexanediol, neopentyl glycol, and the like; 1,4-cyclohexanedimethanol; hydroquinone bis-(hydroxyethyl)ether; cyclohexylene diols (1,4-, 1,3-, and 1,2-isomers), isopropylidene bis(cyclohexanols); diethylene glycol, dipropylene glycol, ethanolamine, N-methyldiethanolamine, and the like; and mixtures of any of the above. In some cases minor proportions (less than about 20 equivalent percent) of the difunctional extender may be replaced by trifunctional extenders without detracting from the thermoplasticity of the resulting TPU; illustrative of such extenders are glycerol, trimethylol-propane and the like. While any of the diol extenders referred to above can be employed alone, or in admixture, it is preferred to use any of 1,4-butane-diol, 1,6-hexanediol, neopentyl glycol, 1,4-cyclohexanedimethanol, ethylene glycol, and diethylene glycol, either alone or in admixture with each other or with one or more aliphatic diols previously named. Particularly preferred diols are 1,4-butanediol, 1,6-hexanediol and 1,4-cyclohexane dimethanol. Also included among the chain extenders which can be used in preparing TPU are adducts obtained by an aliphatic diol or triol such as 1,4-cyclohexane dimethanol, neopentyl glycol, hexane-1,2-diol, ethylene glycol, butane- 1,4-diol, trimethylolpropane, and the like, with caprolactone in a mole ratio of from 0.01 to 2 moles of caprolactone per mole of diol or triol.

The equivalent proportions of polymeric diol to said extender can vary considerably depending on the desired hardness for the TPU product. Generally, the proportions fall within the respective range of from about 1:1 to about 1:20, preferably from about 1:2 to about 1:10. At the same time, the overall ratio of isocyanate equivalents to equivalents of active hydrogen containing materials is within the range of 0.90:1 to 1.10:1, and preferably, 0.95:1 to 1.05:1.

While any of the diol extenders described and exemplified above can be employed in preparing the thermoplastic polyurethane, alone, or in admixture, it is preferred to use 1,4-butanediol, neopentyl glycol, 1,4-cyclohexane dimethanol, ethylene glycol and diethylene glycol either alone or in admixture with each other.

The TPU forming ingredients may be reacted in organic solvents but are preferably reacted in the absence of solvent by melt-extrusion at a temperature of from about 125° C. to about 250° C., preferably from about 160° C. to about 225° C. Preferably, the chain extender and the polyol, each of which has been previously heated, are first mixed and the late resulting mixture is mixed with the heated polyisocyanate. Advantageously, the rate of reaction may be increased by adding any suitable catalyst to the reaction mixture such as tertiary amines and the like set forth in U.S. Pat. Nos. 2,620,516; 2,621,166 and 2,729,618 all incorporated herein by reference. Any of the catalysts conventionally employed in the art to catalyze the reaction of an isocyanate with a reactive hydrogen containing compound can be employed for this purpose; see, for example, Saunders et al., "Polyurethanes: Chemistry and Technology", Part I, Interscience, New York, 1963, pages 228–232; see also, Britain et al., J. Applied Polymer Science, 4, pages 207–211, 1960. Such catalysts include organic and inorganic acids, salts of and organometallic derivatives of bismuth, lead, tin, iron, antimony, uranium, cadmium, cobalt thorium, aluminum, mercury, zinc, nickel, cerium molybdenum, vanadium, copper, manganese and zirconium, as well as phosphines and tertiary organic amines. Representative organotin catalysts are stannous octoate, dibutyltin dioctoate, dibutyltin dilaurate, and the like. Representative tertiary organic amine catalysts are triethylamine, triethylenediamine, N,N,N',N'-tetramethylethylenediamine, N,N,N'N'-tetraethylethylenediamine, N-methylmorpholine, N-ethylmorpholine, N,N,N'N'-tetramethylguanidine, N,N,N'N'-tetramethyl-1,3-butanediamine, N,N-diemthylethanolamine, N,N-diethylethanolamine, and the like. The amount of catalyst employed is generally within the range of about 0.02 to about 2.0 percent by weight based on the total weight of the reactants.

Other techniques for the production of thermoplastic polyurethanes useful in the context of the present invention are disclosed in the text "Polyurethanes: Chemistry and Technology", Vol. 2, pp. 299–452 by J. H. Saunders and K. C. Frisch, Interscience Publishers, New York (1964), incorporated herein by reference.

Other thermoplastic polyurethanes suitable in the present context have been disclosed in U.S. Pat. Nos. 2,621,166; 2,729,618; 3,214,411; 2,778,810 and 4,376,834 and Canadian Patents 754,233; 733,577 and 842,325, all incorporated herein by reference.

The copolyolefins useful in the present invention are crystalline or crystallizable thermoplastic $C_2$–$C_{18}$ copolymers of monomers containing olefinic, that is carbon-carbon double bond, unsaturation.

Advantageously, olefinic monomers will contain 2 to 6 carbon atoms such as ethylene, propylene, alpha- or beta-butylene, isobutylene, 1-pentene, 2-pentene, 2-methyl-1-butene, 2-methyl-2-butene and 1-hexene. The crystalline melting point of the suitable copolyolefins is above 100° C., more preferably about 100 to 250° C. Among the examples of such suitable copolyolefins, mention may be made of copolymers of mono olefins with mono or diolefins or with vinyl monomers. Included are ethylene-propylene copolymer, (optionally with one or more additional monomers, for instance, EPDM), ethylene vinyl acetate copolymer, ethylene butylene copolymer, ethylene-vinyl acrylate copolymer; ethylene-acrylic acid; propylene-4-methylpentene-1 -copolymer; ethylene-methacrylic acid copolymer; as well as their respective ionomers. The preparation of these polyolefins is known (see, for instance, "Olefin Polymers", Vol. 14, Kirk Othmer Encyclopedia of Chemical Technology, pp. 217–335 (1967)).

Particularly useful copolymers are the alpha olefins, particularly, ethylene and propylene and the most preferred embodiment entails a copolymer of ethylene and propylene. Especially preferred are the copolymers where the propylene units are present at an amount of 1 to 50, most preferably 25 to 35, percent relative to the weight of the copolymer.

The invention is further illustrated but is not intended to be limited by the following examples in which all parts and percentages are by weight unless otherwise specified.

EXAMPLES

Experimental

The data tabulated below summarizes the results of evaluating blends within the scope of the invention. In preparing the blends, the following components were used:

the thermoplastic polyurethane (TPU) was derived from a polyether polyol (difunctional copolymer of ethylene oxide and propylene oxide having a number average molecular weight of 4,000 g/mol; propylene oxide/ethylene oxide=80/20), bis(4-isocyanatocyclo-hexyl) methane, and butanediol.

A high melt flow version of this TPU (melt flow of 80 g/10 min. (at 160° C.; 10 kg weight)) is designated below as HMTPU.

A corresponding low melt flow TPU (43 g/10 min.) is designated below as LMTPU.

A copolymer of ethylene and propylene (68+/−3% ethylene) is designated below as EPR.

The compositions described below were prepared on a ZSK-30 twin-screw, co-rotating extruder operating at 150 rpm. The extruder has six heating zones and a heated die. The set point temperatures were as follows:

| Zone | Set Point Temperature (° C.) |
|---|---|
| 1 | 170 |
| 2 | 175 |
| 3 | 175 |
| 4 | 180 |
| 5 | 180 |
| 6 | 180 |
| Die | 190 |

The mechanical properties of a blend made in accordance with the invention were determined as shown in the tables below.

TABLE 1

Mechanical properties of blends containing HMTPU and the indicated amounts of EPR.

| EPR (%) | Tensile strength (psi) | Elongation (%) | Die C tear (lb./in.) | Hardness (Shore A) |
|---|---|---|---|---|
| 0 | 770 | 260 | 210 | 75 |
| 10 | 820 | 280 | 230 | 73 |
| 20 | 910 | 250 | 220 | 70 |
| 30 | 850 | 250 | 210 | 70 |
| 40 | 660 | 240 | 160 | 68 |
| 50 | 580 | 210 | 160 | 65 |

TABLE 2

Mechanical properties of blends containing LMTPU and the indicated amounts of EPR.

| EPR (%) | Tensile strength (psi) | Elongation (%) | Die C tear (lb./in.) | Hardness (Shore A) |
|---|---|---|---|---|
| 0 | 1120 | 320 | 300 | 74 |
| 10 | 1260 | 380 | 310 | 75 |
| 20 | 1140 | 360 | 280 | 75 |
| 30 | 920 | 320 | 230 | 71 |
| 40 | 770 | 270 | 200 | 69 |
| 50 | 630 | 230 | 180 | 66 |

TABLE 3

Aging properties -Tensile Strength- of the inventive compositions (HMTPU-EPR)

| High MFI | Tensile Strength (psi) | | | | | |
|---|---|---|---|---|---|---|
| Wt. % EPR | 0 | 10 | 20 | 30 | 40 | 50 |
| As Molded | 770 | 820 | 900 | 850 | 660 | 580 |
| 3 Days | 890 | 840 | 910 | 860 | 710 | 540 |
| 7 Days | 720 | 950 | 1040 | 980 | 820 | 620 |
| 14 Days | 410 | 550 | 640 | 580 | 520 | 440 |
| 21 Days | 400 | 530 | 580 | 450 | 400 | 350 |

TABLE 4

Aging properties -Elongation (%)- of the inventive compositions (HMTPU-EPR)

| High MFI | Elongation (%) | | | | | |
|---|---|---|---|---|---|---|
| Wt. % EPR | 0 | 10 | 20 | 30 | 40 | 50 |
| As Molded | 260 | 280 | 250 | 250 | 240 | 210 |
| 3 Days | 180 | 190 | 160 | 250 | 170 | 150 |
| 7 Days | 120 | 190 | 210 | 240 | 220 | 180 |
| 14 Days | 50 | 70 | 90 | 90 | 100 | 120 |
| 21 Days | 40 | 70 | 70 | 60 | 60 | 70 |

TABLE 5

Aging properties -Tensile Strength- of the inventive compositions (LMTPU-EPR)

| Low MFI | Tensile Strength (psi) | | | | | |
|---|---|---|---|---|---|---|
| Wt. % EPR | 0 | 10 | 20 | 30 | 40 | 50 |
| As Molded | 1120 | 1260 | 1140 | 920 | 770 | 630 |
| 3 Days | 1100 | 1230 | 1280 | 1170 | 980 | 750 |
| 7 Days | 900 | 1080 | 1140 | 1030 | 820 | 670 |
| 14 Days | 580 | 760 | 700 | 650 | 500 | 390 |
| 21 Days | 570 | 660 | 650 | 530 | 450 | 350 |

TABLE 6

Aging properties -Elongation (%)- of the inventive compositions (LMTPU-EPR)

| Low MFI | Elongation (%) | | | | | |
|---|---|---|---|---|---|---|
| Wt. % EPR | 0 | 10 | 20 | 30 | 40 | 50 |
| As Molded | 320 | 380 | 360 | 320 | 270 | 230 |
| 3 Days | 230 | 280 | 330 | 330 | 300 | 260 |
| 7 Days | 200 | 220 | 280 | 270 | 240 | 200 |
| 14 Days | 70 | 110 | 110 | 120 | 110 | 100 |
| 21 Days | 70 | 90 | 100 | 80 | 80 | 80 |

The results point to that compositions in accordance with the invention exhibit improved properties as compared with the base resin.

In an additional set of experiments, the composition of the invention has been compared to compositions where homopolyolefins were used in substitution of the copolyolefin CPEP. The polypropylene used in these experiments was a homopolymer having a melt flow index of 19 g/10 min. at 160° C., and a density of 1.049 g/cm3 (referred to below as PP) and the polyethylene was a homopolymer characterized in that melt flow index was 71 g/10 min. at 160° C., and the density was 1.025 g/cm3 (referred to below as PE). Also varied in these experiments was the thermoplastic polyurethane: four types of TPU were thus used prepared from (i) aliphatic isocyanate and polyether polyol (representing the invention) and designated below as ALPETH, (ii) aliphatic isocyanate and polyester polyol, designated below as ALPES (iii) aromatic isocyanate and polyether polyol, designated as ARPETH and (iv) aromatic isocyanate and polyester polyol designated as ARPES. The composition, the properties of which are compared below to the properties of the base resins, each contained 10% of the indicated polyolefin.

The dependency of the mechanical properties on the type of polyolefin and on the TPU is demonstrated in the following tables:

|  | Tensile Strength (psi) | Elongation (%) | Die C Tear (lb./in) |
| --- | --- | --- | --- |
| ALPETH | 830 | 250 | 240 |
| ALPETH + PE | 860 | 200 | 210 |
| ALPETH + PP | 760 | 190 | 190 |
| ALPETH + CPEP | 1000 | 270 | 270 |
| ALPES | 3900 | 440 | nd |
| ALPES + PE | 3400 | 450 | 510 |
| ALPES + PP | * | * | * |
| ALPES + CPEP | 3400 | 470 | 490 |
| ARPETH | 5500 | 500 | 500 |
| ARPETH + PE | 4300 | 560 | 570 |
| ARPETH + PP | 4500 | 610 | 530 |
| ARPETH + CPEP | 4700 | 670 | 480 |
| ARPES | 5000 | nd | 500 |
| ARPES + PE | 5500 | 580 | 530 |
| ARPES + PP | 4700 | 550 | 520 |
| ARPES + CPEP | 5400 | 590 | 480 | nd - not determined
* the material system was grossly incompatible and could not be molded.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   (i) 99 to 50 percent of a thermoplastic polyurethane, the molecular structure of which contains ether units and units derived from an aliphatic isocyanate, and
   (ii) 1 to 50 percent of a copolymer, the molecular structure of which consists of units derived from ethylene and propylene, wherein said copolymer contains 25 to 35 percent by weight of propylene units.

2. The thermoplastic molding composition of claim 1 wherein said ether units are derived from a polyol having a number average molecular weight of at least 400.

3. The molding composition of claim 2 wherein said molecular weight is at least 2,000 but less than 8,000.

4. The molding composition of claim 2 wherein said polyols are selected from the group consisting of polyether polyol, polyoxyethylene glycols, polyoxypropylene glycols, copolymers of ethylene oxide and propylene oxide, polytetramethylene glycols, copolymers of tetrahydrofuran and ethylene oxide and copolymers of tetrahydrofurane and propylene oxide.

5. The molding composition of claim 4 wherein the polyol is a copolymer of ethylene and propylene oxide.

6. The thermoplastic molding composition of claim 1 wherein aliphatic polyisocyanate is a diisocyanate.

7. The thermoplastic molding composition of claim 1 wherein isocyanate is at least one member selected from the group consisting of hexamethylene diisocyanate, isophorone diisocyanate, methylene bis(cyclohexyl isocyanate), cyclohexylene diisocyanate, 1-methyl-2,5-cyclohexylene diisocyanate, 1-methyl-2,4-cyclohexylene diisocyanate, 1-methyl-2,6-cyclohexylene diisocyanate and 4,4'-isopropylidene bis(cyclohexyl isocyanate).

* * * * *